United States Patent [19]
Craddock

[11] 3,764,854
[45] Oct. 9, 1973

[54] OIL FIELD SECONDARY

[76] Inventor: Mike Craddock, 1804 Dixie St., Big Spring, Tex.

[22] Filed: May 17, 1971

[21] Appl. No.: 143,867

Related U.S. Application Data

[63] Continuation of Ser. No. 755,419, Aug. 26, 1968, abandoned.

[52] U.S. Cl. .................. 317/68, 317/61.5, 337/28
[51] Int. Cl. ............................................. H02h 1/04
[58] Field of Search .................. 317/61, 61.5, 67, 317/68; 337/28, 34; 315/36

[56] References Cited
UNITED STATES PATENTS

| | | | |
|---|---|---|---|
| 1,004,534 | 9/1911 | Creighton | 317/61 |
| 2,112,097 | 3/1938 | Johnson | 317/61 |
| 2,290,639 | 7/1942 | Evans | 317/68 |

Primary Examiner—J. D. Miller
Assistant Examiner—Harvey Fendelman
Attorney—Richards, Harris & Hubbard

[57] ABSTRACT

An excessive voltage arrestor is disclosed which has four conductors for connection to three-phase power lines and ground. Three conductors are disposed in a silicon oxide filler at equal distances from each other, with the neutral ground conductor centrally positioned to form a Y configuration. The silicon oxide filler is nonconductive at normal voltages and highly conductive after ionization by excessive voltages. A nonconductive casing forms an electrically insulated compartment containing the conductors and filler.

12 Claims, 5 Drawing Figures

PATENTED OCT 9 1973　　3,764,854

INVENTOR:
MIKE CRADDOCK

Richards, Harris & Hubbard
ATTORNEYS

OIL FIELD SECONDARY

This application is a continuation of a prior application, Ser. No. 755,419, filed Aug. 26, 1968, now abandoned.

BACKGROUND OF THE INVENTION

This invention relates to lightning protection and more particularly to a device for protecting oil field electrical equipment from damage due to lightning and other harmful high voltage transients common in oil field electrical systems.

A number of different devices have been designed and offered commerically to the oil industry for controlling lingtning and high-voltage transients. One type, for three-phase systems, employs a separate thyrite or silicon carbide plug connected to each of three power lines. Each plug is common to a metal case comprising the outer surface of the device. The metal case has a grounding wire connected to it to ground the arrestor. Another type employs three conductors mechanically spaced with respect to a grounded bus bar to provide a measured air gap between the conductors and an earth ground. Neither of these types is mechanically arranged to coincide with the natural shape of the electrostatic field associated with the impressed voltage.

In some polyphase systems a number of single pole arrestor devices are interconnected to establish current flow paths during high voltages. However, lines of electrostatic force do not lend themselves to following irregular metallic paths and rapid high current discharges are not effectively permitted by such arrangements.

High voltage arrestor devices using materials such as silicon carbide have presented several problems. Once the conduction threshold is reached, silicon carbide acts like a carbon resistor. Thus, although a current path is established, high voltages are not immediately eliminated. Furthermore, under high potential, high temperature conditions silicon carbide tends to separate, diminishing its usefulness in repeated applications. arrestors containing silicon carbide frequently leak some current at line voltage after they have conducted a few times. Such leak current is inefficient and may cause considerable radio and television interference.

SUMMARY OF THE INVENTION

This invention employs a physical arrangement of conductors compatible to the normal shape of the electrostatic field associated with the power system. An improved material is provided in contact with the metallic conductors to rapidly dissipate lightning and high voltage transients from the power system. The invention employs a nonconductive plastic case to reduce dangers of electrical shock.

More particularly, in accordance with the present invention there is provided an arrangement of electrical conductors in which each live conductor is positioned an equal distance from each of the other live conductors. An electrical ground conductor is positioned an equal distance from each of the live conductors, forming a Y configuration. The conductors are connected by electrical wires to power lines in a power system. Grandulated silicon oxide material, such as a mixture of grandulated quartz and silica, is placed between the conductors to provide insulation at normal voltages and a high degree of conduction at excess voltages.

by arranging the conductors equal distances apart, the length of the conducting path from any one conductor to the any of the other conductors is equal. This spatial equivalency is important in providing balanced and direct current discharge paths which conform to the natural electrostatic field.

The use of silicon oxides between the conductors provides for an ionizing "avalanche effect" at high voltages which effectively eliminates excessive voltages beyond a predetermined cutoff level. As the voltage between two conductors approaches the cutoff point, elecrons are dislodged from the silicon oxide compound. The movement of these electrons through the material dislodges more electrons resulting in an "avalanche" of electron current. As the voltage increases beyond the cutoff point the "avalanche effect" increases, thereby increasing conduction. The voltage is thus held to the cutoff level by increases in the current.

The ionization of silicon oxide results in an absorption of energy. Therefore, much of the heat generated during a high current discharge is absorbed by the ionization process. After discharge the silicon oxide ions recapture their electrons and return to their natural state releasing the energy previously absorbed. This damping effect reduces the intensity of heat dissipation during discharge by spreading it over a longer period of time. An arrestor using such silicon oxides is therefore able to withstand higher current transients and give longer life.

For a more complete understnading of the present invention and for further objects and advantages thereof, reference may now be had to the following description taken in conjunction with the accompanying drawings in which:

DESCRIPTION OF THE PREFERRED EMBODIMENT

Figure 1:
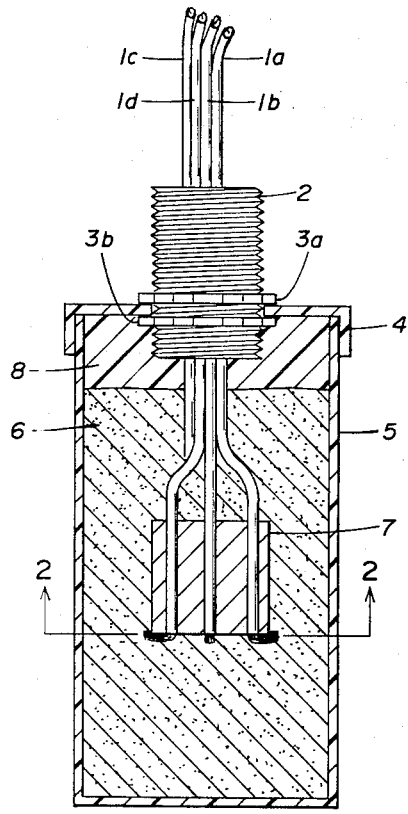
FIG. 1 is a sectional view of an arrestor constructed in accordance with a preferred embodiment of the invention.
Figure 3:
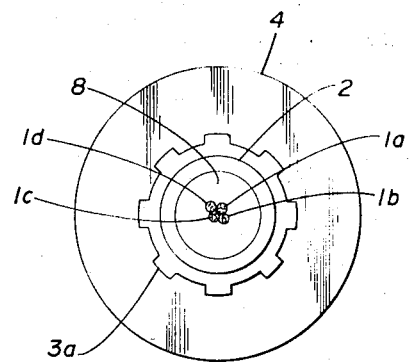
FIG. 3 is a top view of the arrestor.
Figure 2:
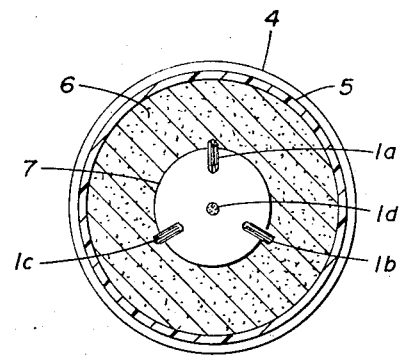
FIG. 2 is a bottom cutaway view showing the configuration of the conductors within the arrestor.

Referring now to FIGS. 1, 2 and 3, one preferred embodiment of the invention is shown. Three insulated copper wires $1a$, $1b$ and $1c$, shown in FIG. 1, are each connected to one of three live phases (not shown) used on a three-phase power system to power an electrically-driven oil well pump. A fourth wire $1d$ is connected to an earth ground. The four wires $1a$, $1b$, $1c$ and $1d$ enter the lightning arrestor casing 5 through a threaded pipe nipple 2 and terminate on a spacer 7, which may be made of a suitable type of ceramic, such as porcelain. As best seen in FIG. 2, spacer 7 arranges the uninsulated ends of wires $1a$, $1b$ and $1c$ (hereafter referred to as conductors $1a$, $1b$ and $1c$) in a 120° configuration, in which each conductor is equally spaced from the other conductors. An uninsulated grounding wire end $1d$ (hereafter referred to as conductor $1d$) is positioned at the center of the 120° configuration, an equal distance from conductors $1a$, $1b$ and $1c$.

Conductors 1a, 1b, 1c and 1d are embedded in a silicon oxide filler material 6 which may be a mixture of granulated quartz and silica. The filler 6 is contained by a nonconductive plastic case 5. The plastic case 5 is capped with a threaded plastic cap 4. The threaded nipple 2 is fastened to the plastic cap 5 with two lock nuts 3a and 3b. Nipple 2 and that part of filler 6 in the upper portion of case 5 are embedded in a catalytic resin 8 to prevent filler 6 from leaking out of case 5 or moisture from leaking in. Mounting the arrestor to existing equipment is accomplished through the use of threaded nipple 2 and two or more lock nuts (not shown).

Figure 4:
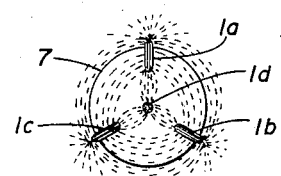
FIG. 4 is a detail cutaway view of the conductors of the arrestor in operation.

At normal voltages within the power system to which the arrestor is connected, no current will flow through the arrestor, since the filler 6 remains nonconductive. However, when a high voltage transient occurs, filler 6 becomes highly conductive and establishes a current flow either from phase to phase or from phase to earth ground according to the least resistive path. FIG. 4 shows the possible paths which current flow may take. For example, from conductor 1c current may flow to conductor 1a, to conductor 1b, or to ground conductor 1d. After the high voltage transient has been dissipated by burning through the silicon oxide filler 6, the arc is extinguished and fresh filler 6 gravitates into the void between the previously conducting electrodes. The arrestor is thus returned to a nonconductive normal operation.

Figure 5:
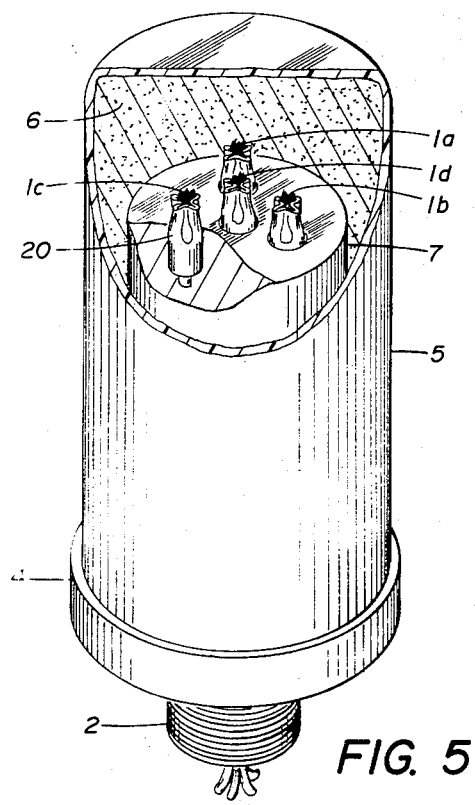
FIG. 5 is a bottom cutaway view showing an alternative embodiment of the invention.

An alternative preferred embodiment is shown in FIG. 5. In this arrangement, conductors 1a, 1b, 1c and 1d are held in position by metal tubing 20. Tubing 20 is embedded in spacer 7 to maintain rigidity. The ends of tubing 20 are crimped to hold the conductors 1a, 1b, 1c and 1d firmly. This embodiment provides the advantages of having all conductors shaped the same. Furthermore, by providing reinforcement for the conductors, their equally-spaced positions are more firmly maintained.

Other alternative embodiments and modifications may be employed within the scope of the invention. For example, in a two-phase system either conductor 1c or 1d might be eliminated depending on the requirements of the system. If conductor 1d were removed, the system ground line could be connected to conductor 1c thereby providing an arrestor with equal spacing for all conductors. If the line-to-ground path were required to be shorter than the line-to-line path, then conductor 1c would be eliminated.

Likewise, other ionizable materials may be employed. It is only important that these materials will produce an ionizing "avalanche effect" when impressed with voltages which are excessive for the power system in use.

Although preferred embodiments of the invention have been described, it is to be understood that various changes, substitutions and alterations can be made therein without departing from the spirit and scope of the invention as defined by the appended claims.

What is claimed is:

1. In apparatus for dissipating excessive voltage transients within an electrical power system, the combination comprising:
    a. a plurality of electrical conductors each spaced from the other said conductors so as to provide paths for current flow between said conductors during said excessive voltage transients;
    b. means for connecting each of said conductors to a power line in said power system; and
    c. a solid ionizable material substantially filling the space between said conductors and being nonconductive at near-normal voltages within said system and highly conductive by ionizing at excessive voltages within said system.

2. The combination defined in claim 1 in which said ionizable material includes a silicon oxide material.

3. The combination defined in claim 1 in which said ionizable material includes a mixture of granulated quartz and silica.

4. The combination defined in claim 1 and further comprising:
    a nonconductive housing defiining a closed, electrically insulated compartment containing said conductors and said material.

5. In apparatus for dissipating excessive voltage transients within an electrical power system, the combination comprising:
    a. at least three electrical conductors each being an equal distance from each of the other conductors thereby providing current flow paths between said conductors during said voltage transients;
    b. means for connecting each of said conductors to a power line in said power system; and
    c. a solid material substantially filling the space between said conductors and being nonconductive at near-normal voltages within said system and highly conductive at excess voltages within said system.

6. The combination defined in claim 5 and further comprising:
    an electrical ground conductor being an equal distance from each of the other said conductors; and
    means for connecting said ground conductor to a ground line in said power system.

7. The combination defined in claim 5 and further comprising:
    a nonconductive housing defining a closed, electrically insulated compartment containing said conductors and said material.

8. In apparatus for dissipating excessive voltage transients within an electrical power system, the combination comprising:
    a. at least two electrical conductors being spaced from each other so as to provide paths for current flow between said conductors during said excessive voltage transients;
    b. an electrical ground conductor being an equal distance from each of the other said conductors so as to provide additional paths for current flow between said ground conductor and the other said conductors during said excessive voltage transients;
    c. means for connecting each of said conductors to a power line in said system; and
    d. solid material substantially filling the space between said conductors and being nonconductive at near-normal voltages within said system and highly conductive at excess voltages within said system.

9. The combination defined in claim 8 and further comprising:
    a nonconductive housing defining a closed electrically insulated compartment containing said conductors and said material.

10. In apparatus for dissipating excessive voltage transients within an electrical three-phase power system, the combination comprising:
   a. a nonconductive housing defining a closed, electrically insulated compartment;
   b. three electrical conductors within said compartment each being an equal distance from the other said conductors;
   c. a fourth electrical conductor within said compartment being an equal distance from the other said conductors;
   d. electrical wires connecting each said conductor to a power line within said system;
   e. a nonconductive spacer within said compartment positioning each said conductor; and
   f. an ionizable material substantially filling said compartment and being nonconductive at near-normal voltages within said system, and highly conductive by ionization of said material at excessive voltages within said system.

11. The combination defined in claim 10 in which said material includes a mixture of granulated quartz and silica.

12. In a system for dissipating high voltage transients, the combination of:
   a. three metallic conductors positioned in a 120° configuration so that each said conductor is equally spaced from the other said conductors;
   b. a fourth grounded conductor which is centrally positioned an equal distance from each of said three conductor ends;
   c. a nonconductive spacer holding said four conductors in said positions;
   d. a filler mixture of granulated quartz and silica substantially filling the space between said conductor ends; and
   e. a nonconductive plastic case containing said conductors, said spacer and said filler.

* * * * *

PO-1050
(5/69)

UNITED STATES PATENT OFFICE
CERTIFICATE OF CORRECTION

Patent No. 3,764,854                     Dated  October 9, 1973

Inventor(s)  Mike Craddock

It is certified that error appears in the above-identified patent and that said Letters Patent are hereby corrected as shown below:

Change the title "OIL FIELD SECONDARY" to --OIL FIELD SECONDARY LIGNTNING ARRESTOR--.

Signed and sealed this 19th day of February 1974.

(SEAL)
Attest:

EDWARD M. FLETCHER, JR.
Attesting Officer

C. MARSHALL DANN
Commissioner of Patents